United States Patent [19]
Iwatsuka et al.

[11] Patent Number: 5,841,922
[45] Date of Patent: Nov. 24, 1998

[54] OPTICAL FIBER TERMINAL WITH OPTICAL ISOLATOR AND SEMICONDUCTOR LASER MODULE USING THE SAME

[75] Inventors: Shinji Iwatsuka; Makoto Sekijima; Kenjiro Hata, all of Tokyo, Japan

[73] Assignee: TDK Corporation, Tokyo, Japan

[21] Appl. No.: 868,205

[22] Filed: Jun. 3, 1997

[30] Foreign Application Priority Data

May 6, 1996 [JP] Japan ................................. 8-143001

[51] Int. Cl.⁶ ................................................. G02B 6/36
[52] U.S. Cl. ................................ 385/76; 385/73; 385/33; 385/88; 372/703
[58] Field of Search .................. 385/76, 33, 77, 385/78, 73, 60, 61, 74, 88–94; 359/497; 872/703

[56] References Cited

U.S. PATENT DOCUMENTS

| | | | |
|---|---|---|---|
| 5,359,689 | 10/1994 | Iwatsuka et al. | 385/73 |
| 5,500,915 | 3/1996 | Iwatsuka et al. | 385/78 |
| 5,691,845 | 11/1997 | Iwatsuka et al. | 359/497 |

*Primary Examiner*—Phan T. H. Palmer
*Attorney, Agent, or Firm*—Seidel, Gonda, Lavorgna & Monaco, PA

[57] ABSTRACT

An optical fiber terminal provided with an optical isolator having a Faraday rotator, including an optical fiber retained in a ferrule, an optical isolator element, and a permanent magnet for applying a magnetic field to the Faraday rotator is improved to provide a minimum possible outer diameter. The fiber terminal comprises an attaching member for fixedly attaching the optical isolator and the permanent magnet to the ferrule together; an air layer between an end of said optical fiber and said optical isolator element; a first outer diameter of said ferrule on the side of the optical isolator constituting a maximum diameter of the optical fiber terminal, a second outer diameter of said ferrule on the side of the optical fiber being smaller than the first maximum diameter; and the periphery of the permanent magnet being exposed to the air.

4 Claims, 3 Drawing Sheets

OPTICAL FIBER TERMINAL WITH OPTICAL ISOLATOR AND SEMICONDUCTOR LASER MODULE USING THE SAME

BACKGROUND OF THE INVENTION

1. Technical Field of the Invention

The present invention relates to an optical fiber terminal provided with an optical isolator and to a semiconductor laser module using such optical fiber terminal, which are used in the fields of optical communication, optical information processing or other similar applications.

2. Prior Art

Optical isolator is one of the key devices in the optical fiber communication which attracts attentions as a means for materializing a highly information-oriented society in the future. Such optical isolator includes an optical isolator element which usually comprises a pair of optical polarizers set at a mutual relative angle of about 45 degrees and a Faraday rotator having a Faraday rotation angle of about 45 degrees inserted between these optical polarizers and all of them being bonded together. The optical isolator functions to allow a forward light to pass therethrough and to shut a backward or return light. Optical isolator is formed by an optical isolator element in combination with a permanent magnet for applying a static magnetic field to the Faraday rotator to magnetically saturate or nearly saturate the Faraday rotator.

There is a strong demand for optical isolators which can be mass-produced with a low cost. As one means of meeting the demand, an optical fiber provided with an integral optical isolator has been proposed. In such device, since the optical isolator is positioned at the terminal portion of the optical fiber, the diameter of light beam passing through the optical isolator becomes small and accordingly the size and cost of the optical isolator can be reduced, and a mass productivity can be enhanced.

However, there has been a problem that the outer diameter of the optical fiber terminal with an optical isolator is larger than the diameter of a ferrule which is usually used. Accordingly, when this optical fiber terminal is used in a semiconductor laser module, such laser module becomes large in size and the conventional assembly line has to be modified to adapt it to such module.

Also, in one method of uniting an optical isolator to an optical fiber, the optical isolator was directly bonded to one end of the optical fiber with an adhesive. However, the bonded area was so small that it was not easy to adjust the angle of the optical isolator and check the condition of adhesion and thus it was difficult to secure a sufficient reliability.

The followings are known prior art references directed to these problem.

For example, Japanese Patent Kokai No. 63-65419 discloses an optical fiber with an optical isolator which is made compact by positioning (by adhesion) the optical isolator in contact with an end of the optical fiber. However, no disclosure is given in this publication as to the specific construction of the terminal portion of the optical fiber provided with the optical isolator. Moreover, as the optical isolator was directly attached to the terminal end of the optical fiber, the above-discussed problem was left unsolved with respect to reliability.

U.S. Pat. No. 5,359,689 discloses an optical fiber terminal with an optical isolator having a structure as shown in FIG. 3. The isolator shown in this figure is not directly bonded to the end surface of the optical fiber but is closely spaced from the end surface with an interposing air layer. Accordingly, the problem of the reliability has been solved.

However, in this type of optical fiber terminal provided with an optical isolator, there still remains a problem that an outer sleeve 15 is arranged around the outer periphery of a magnet 9 in the inner bore of which the optical isolator 1 is inserted and accordingly the outer diameter (maximum diameter) of the fiber terminal had to be larger than the outer diameter of the ferrule 8.

Further, U.S. Pat. No. 5,500,915 discloses an optical fiber terminal with an optical isolator in which, as shown in FIG. 4, the optical isolator 1 is positioned axially outwardly of a magnet 9 so as to reduce the outer diameter of the optical fiber terminal. With this construction, the outer diameter of the optical fiber terminal can be made smaller than that of the terminal disclosed in U.S. Pat. No. 5,359,689 but the problem has not been solved because a connection sleeve 16 has an outer diameter larger than the outer diameter of the ferrule 8.

Accordingly, an object of the invention is to provide an optical fiber terminal provided with a reliable optical isolator which has a smaller outer diameter (of ferrule) than that of the conventional optical fiber terminal provided with an optical isolator, and to provide a semiconductor laser module using the optical fiber terminal with the optical isolator.

SUMMARY OF THE INVENTION

The present invention provides an optical fiber terminal provided with an optical isolator, which comprises:

an optical fiber terminal provided with an optical isolator, which comprises:

an optical fiber retained in a ferrule;

an optical isolator element including at least one optical polarizer and at least one Faraday rotator;

a permanent magnet for applying a magnetic field to said Faraday rotator;

an attaching member for fixedly supporting said optical isolator element and the permanent magnet, said attaching member being fixed to said ferrule for integrally uniting said optical isolator, said permanent magnet and said ferrule together;

an air layer between an end of said optical fiber and said optical isolator element;

a first outer periphery of said ferrule having a maximum diameter of said optical fiber terminal;

a second outer periphery of said ferrule on the side of the optical isolator element having a diameter smaller than said maximum diameter; and the outer periphery of said permanent magnet being exposed to the air.

In a preferred form of the optical fiber terminal according to the present invention the attaching member is a cup member including a ring portion having an inner periphery fit on the second outer periphery of the ferrule and a disc on which the permanent magnet and the optical isolator element are fixedly supported, the outer diameter of the cup member is substantially the same as or less than the maximum diameter of the ferrule, and the disc has a central aperture for light passage.

The present invention further provides a semiconductor laser module which uses an optical fiber terminal provided with an optical isolator which is constructed according to the present invention.

DETAILED DESCRIPTION OF THE INVENTION

Figure 1:
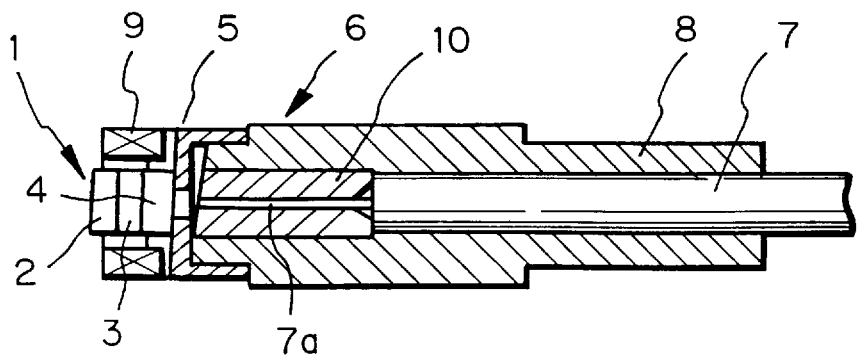
FIG. 1 shows a longitudinal cross sectional view of the optical fiber terminal provided with an optical isolator according to one embodiment of the present invention.

The present invention will now be explained in connection with an embodiment in detail, in making reference to FIG. 1. The optical fiber terminal provided with an optical isolator according to the present invention composed of an optical fiber terminal and an optical isolator. The optical fiber terminal is composed of the portion of the optical fiber 7 extending from an end of an optical bare fiber 7a and associated members.

The optical fiber terminal includes an optical fiber 7, a capillary tube 10 around the optical bare fiber 7a and a ferrule 8 to support the optical fiber 7. The optical isolator includes an optical isolator element 1 consisting of at least one optical polarizer and at least one Faraday rotator and a permanent magnet 9 for applying a magnetic field to the Faraday rotator.

Further, the optical fiber terminal and the optical isolator are fixed together by means of an attaching or fixing member 5.

The optical fiber terminal provided with the optical isolator according to the present invention is not provided with any outer sleeve around the periphery of the optical fiber terminal and the optical isolator. Accordingly, the outer diameter of the optical fiber terminal provided with the optical isolator is smaller than the conventional one.

Usually, such outer sleeve provided around the permanent magnet is to protect the magnet from chipping off and is often used to attach the optical fiber terminal to other members.

However, such outer sleeve is not particularly necessary in the present invention because the optical fiber terminal is mounted or fixed on another device and the outer periphery of the optical fiber is usually surrounded by a connector formed on the side of such device. For example, with a semiconductor laser module 12 shown in FIG. 2, the outer periphery of the optical fiber terminal 6 is inserted into the module with the outer periphery of the optical fiber terminal being embedded in a slide ring 11 and thus any special protection is unnecessary. Semiconductor laser module 12 includes a lens 13 and a laser generating means 14, whereby laser energy from laser generating means 14 is coupled to the optical fiber terminal 6 through lens 13.

Further, with the optical fiber terminal provided with the optical isolator according to the present invention, the optical isolator element 1 and a permanent magnet 9 are incorporated into the optical fiber terminal using the attaching member 5 and accordingly provision of outer sleeve for connection with another member is not necessary.

Referring again to FIG. 1, the attaching member 5 is fixed to the ferrule 8 for integrally uniting the optical isolator element 1 and the permanent magnet 9 with the ferrule 8 together. An air layer is formed between the end of the optical fiber 7 and the optical isolator element 1.

The outer periphery of the ferrule 8 forms the maximum diameter of the optical fiber terminal. The left end portion of the outer periphery of the ferrule 8 has a reduced diameter.

Figure 5:
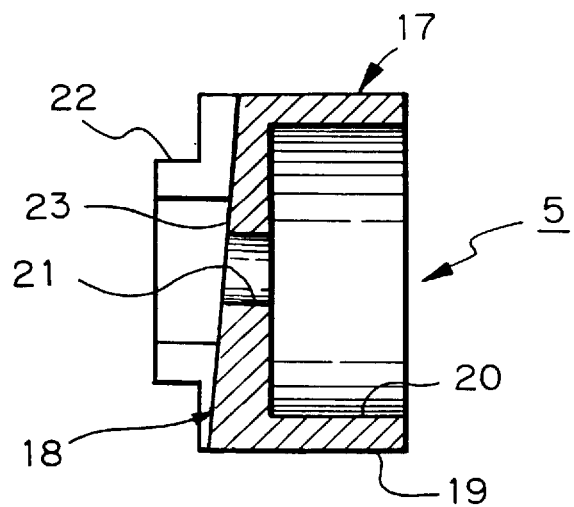
FIG. 5 is a longitudinal enlarged cross sectional of an example of an attaching member used in the present invention.
Figure 6:
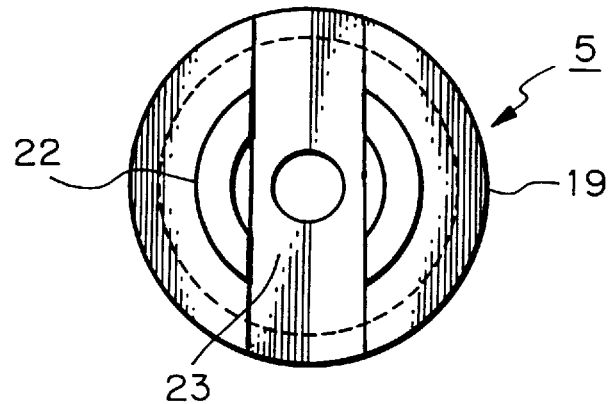
FIG. 6 is an elevational view as seen from the right hand side of FIG. 5.
Figure 7:
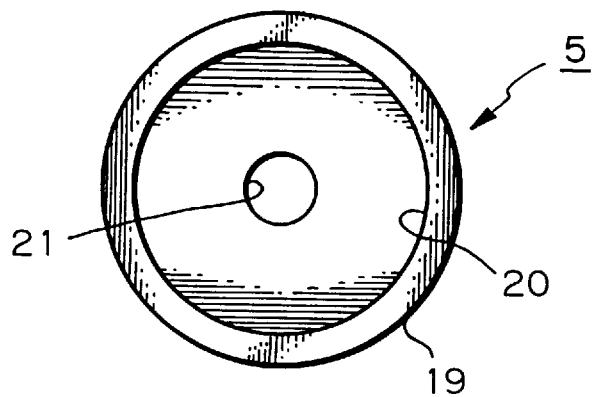
FIG. 7 is an elevational view as seen from the left hand side of FIG. 5.

As illustrated in FIGS. 5, 6 and 7, the attaching member 5 has a form of a cup including a ring portion 17 having an outer periphery 19 which is the same as or smaller in diameter than the outer periphery of the ferrule 8 and an inner periphery 20 which is adapted to fit on the left end reduced diameter portion of the ferrule 8. The attaching member 5 further includes a disc portion 18 on which the permanent magnet 9 and the optical isolator element 1 are fixedly supported. The disc portion 18 has a central aperture 21 in alignment with the optical isolator element 1.

The disc portion 18 is cut out to form a space 23 for attachment of the optical isolator element 1.

In the optical fiber terminal with the optical isolator according to the present invention, the optical isolator element 1 and the permanent magnet 9 in the form of a ring having a smaller outer diameter than the maximum diameter of the ferrule 8 are fixedly mounted respectively on the surface of the disc area 23 and the disc portion 18 of the attaching member 5 using an eplxy adhesive, a low melting point glass, a solder, etc. The inner periphery 20 of the attaching member 5 is in turn fit on the reduced diameter periphery of the ferrule 8 and fixed with laser welding method. Also, the outer diameter of the attaching member 5 is made the same as or smaller than the maximum diameter of the ferrule 8 and hence the outer diameter of the ferrule 8 is the maximum diameter of the optical fiber terminal provided with the optical isolator. Thus, the attaching member 5 not only fixes the optical isolator element 1 and the permanent magnet 9 but also bonds them to the ferrule 8.

Thus, since the optical isolator is fixed to the element attaching member 5, a highly reliable means of fixing such as solder or low melting point glass can be used. In addition, by performing the attachment strength test on the attaching member, reliability can be easily established.

EXAMPLES

A specific example of an optical fiber terminal provided with an optical isolator according to the present invention will now be explained by making reference to FIG. 1.

The optical isolator element 1 illustrated in FIG. 1 was prepared which was composed of an optical polarizer 2, a Faraday rotator 3 and an optical polarizer 4. The optical polarizers 2 and 4 were made of single crystal rutile plates having a thickness of 0.8 mm, and the Faraday rotator 3 was made of a Bi-substituted rare earth garnet crystal having a thickness of 0.4 mm. The size of this optical isolator element was 1.0 mm high, 1.0 mm wide and 2.0 mm thick.

A permanent magnet 9 for applying a magnetic field to the Faraday rotator 3 was made of samarium cobalt having an outer diameter of 2.4 mm, an inner diameter of 1.6 mm, and thickness of 1.0 mm.

On the other hand, a ferrule 8 was fixedly attached with an epoxy adhesive to an optical fiber 7 which was formed by stripping the outer sheath of one end portion of an optical cable and incorporating a capillary tube 10. The end surface of the optical fiber 7 was ground to give an oblique end face at an angle of 8 degrees. This ferrule 8 had a maximum outer diameter of 2.5 mm at the middle portion as measured along the longitudinal axis and both end portions have smaller diameters (2.0 mm). The material for the ferrule was stainless steel.

An attaching member 5 made of stainless steel was in the form of a cup having a ring portion having an outer diameter of 2.4 mm, an inner diameter of 2.0 mm on the side of the optical fiber 7 and a disc portion had an aperture of 0.7 mm.

Next, a step of attaching a permanent magnet 9 and the optical isolator element 1 to the cable end by means of this attaching element 5 will be explained.

First of all, the permanent magnet 9 was attached to the element attaching member 5 with use of an epoxy resin and then the optical isolator element 1 was attached to the element attaching member 5 at an angle of 5 degrees with respect to the central axis with use of a solder. Thereafter, the magnet 9 was magnetized to saturate the magnetization of the Faraday rotator 3.

Next, the bore portion (the portion having a diameter of 2.0 mm) of the attaching member 5 on which the optical isolator element 1 had been fixed in the cut out space area 23 and the permanent magnet 9 had been fixedly mounted was fixed on one end of the cable with the oblique cut surface and then the attaching member 5 was fixedly bonded to the cable end with laser welding method to complete an optical fiber terminal 6 provided with the optical isolator.

The resulting optical fiber terminal provided with the optical isolator was evaluated with respect to its optical properties and an isolation of 42 dB and an insertion loss of were 0.15 dB which proved that the optical fiber terminal 6 with the optical isolator can be commercially utilized.

Further, the maximum outer diameter of this optical fiber terminal 6 with the optical isolator is at the middle portion (the portion of a diameter of 2.5 mm) as measured along the longitudinal axis which is the same as that of the conventional optical fiber terminal with no optical isolator and accordingly this optical fiber terminal 6 with an optical isolator can be handled in a manner similar to simple optical fiber terminals with no optical isolator.

The above example was explained as having an outer diameter of 2.5 mm but the present invention may be equally applied to different sizes, for example 2.0 mm, by using correspondingly smaller members. In other words, the present invention may be applied to any other dimensions than 2.0 mm or 2.5 mm by appropriately modifying the sizes of the respective members.

Figure 2:
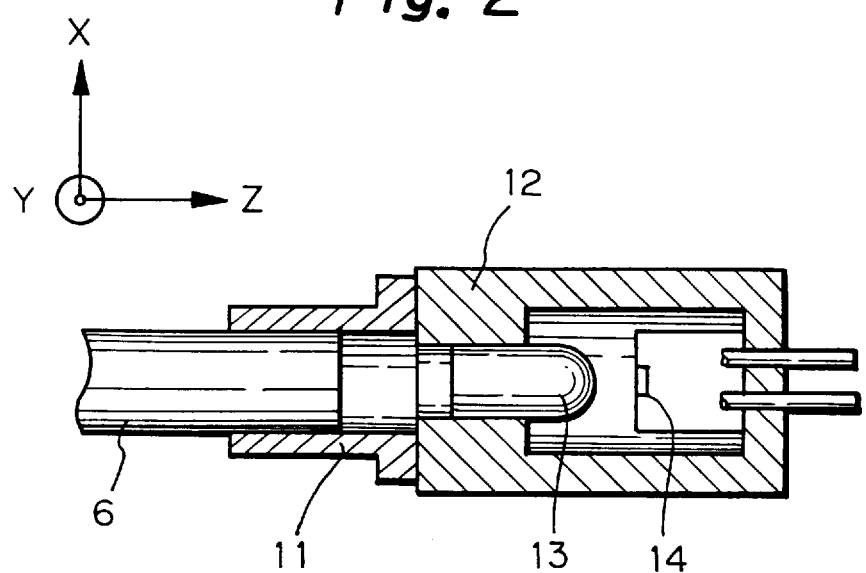
FIG. 2 shows a longitudinal cross sectional view of the semiconductor module according to a second embodiment of the present invention.
Figure 3:
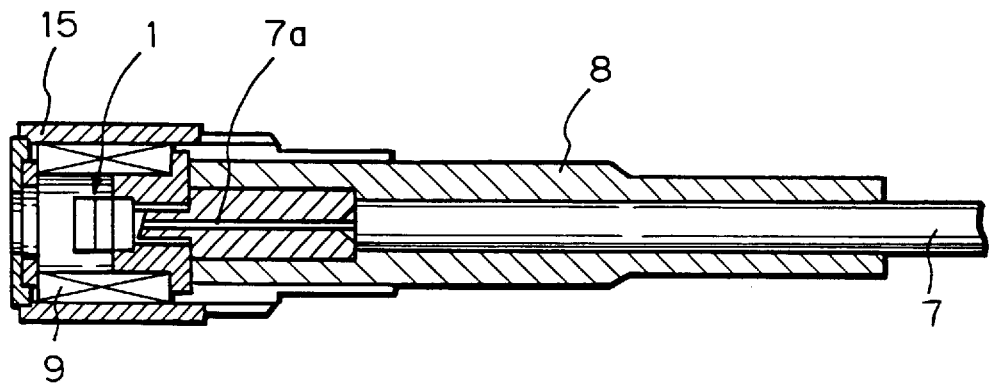
FIG. 3 shows a longitudinal cross sectional view of one conventional optical fiber terminal with an optical isolator.
Figure 4:
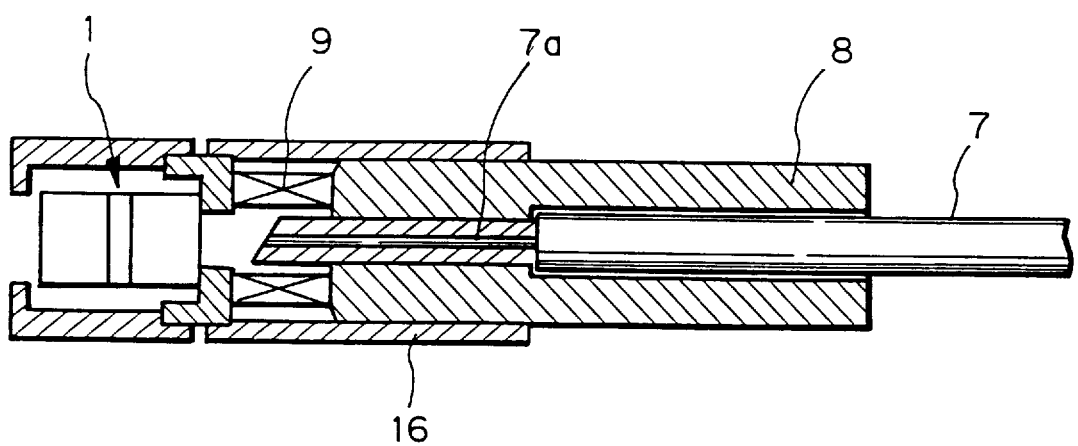
FIG. 4 shows a longitudinal cross sectional view of another conventional optical fiber terminal with an optical isolator.

Next, an embodiment of a semiconductor laser module in which the optical fiber terminal provided with the optical isolator illustrated in FIG. 2.

The semiconductor module was assembled by first inserting the optical fiber terminal 6 provided with the optical isolator into a slide ring 11, adjusting its Z axial position and then the X-Y positions to perform registration with the axis of a lens holder 12 and then fixing the slide ring 11 to the lens holder 12. It is noted that the optical fiber terminal with the optical isolator according to the present invention had the same diameter as the ordinary fiber terminal, namely, simple optical fiber terminal with no optical isolator, and accordingly the assemblage of the semiconductor module can be carried out in a manner similar to the conventional simple optical fiber terminal using the same method and device because the attachment of an optical isolator does not make larger the size of the outer diameter.

From the foregoing, the following advantages are obtained according to the optical fiber terminal with the optical isolator.

(1) Although the optical fiber terminal is provided with an optical isolator, the optical fiber terminal can be treated in a manner similar to the conventional one as their outer diameters are identical. Also, it is also appropriate to apply the fiber terminal for a semiconductor laser module.

(2) The optical isolator element is not directly bonded to the end surface of the optical fiber but fixed to the element attaching member and thus a high reliability can be obtained.

(3) Outer sleeve is not provided and accordingly the number of constitutional members is fewer and hence a low cost production can be materialized.

What we claim is:

1. An optical fiber terminal provided with an optical isolator, which comprises:

an optical fiber retained in a ferrule;

an optical isolator element including at least one optical polarizer and at least one Faraday rotator;

a permanent magnet for applying a magnetic field to said Faraday rotator;

an attaching member for fixedly supporting said optical isolator element and the permanent magnet, said attaching member being fixed to said ferrule for integrally uniting said optical isolator, said permanent magnet and said ferrule together;

an air layer between an end of said optical fiber and said optical isolator element;

a first outer periphery of said ferrule having a maximum diameter of said optical fiber terminal;

a second outer periphery of said ferrule on the side of the optical isolator element having a diameter smaller than said maximum diameter; and the outer periphery of said permanent magnet being exposed to the air.

2. An optical fiber terminal according to claim 1 wherein said attaching member is a cup member including a ring portion having an inner periphery fit on said second outer periphery of said ferrule and a disc on which said permanent magnet and said optical isolator element are fixedly supported, the outer diameter of said cup member is substantially the same as or less than said maximum diameter, said disc has a central aperture in alignment with said optical isolator element.

3. A semiconductor laser module including a holder including laser generating means and an optical fiber terminal registered with said laser generating means, said optical fiber terminal being constructed according to claim 2.

4. A semiconductor laser module including a holder including laser generating means and an optical fiber terminal registered with said laser generating means, said optical fiber terminal being constructed according to claim 1.

* * * * *